June 24, 1969 L. A. FERRARI 3,452,245

HIGH-VOLTAGE SWITCHING FOR THREE-COLOR LINE-SEQUENTIAL COLOR TELEVISION

Filed Aug. 22, 1966 Sheet 1 of 3

INVENTORS
Leonard A. Ferrari

BY
Brown and Mikulka
and
James E. Mrose
ATTORNEYS

INVENTORS
Leonard A. Ferrari
BY
Brown and Mikulka
and
James E. Mrose
ATTORNEYS

INVENTORS
Leonard A. Ferrari
BY
Brown and Mikulka
and
James E. Mrose
ATTORNEYS

United States Patent Office 3,452,245
Patented June 24, 1969

3,452,245

HIGH-VOLTAGE SWITCHING FOR THREE-COLOR LINE-SEQUENTIAL COLOR TELEVISION

Leonard A. Ferrari, Woburn, Mass., assignor to Polaroid Corporation, Cambridge, Mass., a corporation of Delaware Filed Aug. 22, 1966, Ser. No. 573,902
Int. Cl. H01j 29/52
U.S. Cl. 315—30 32 Claims

ABSTRACT OF THE DISCLOSURE

This specification discloses a color television system of the type in which a full color image is produced by superimposed red and white images corresponding to different color video signals representing different wavelength contents of the televised scene. The red and white images are produced by accelerating the electron beam to different velocities and the velocity of the electron beam is switched between these different velocities to produce the two superimposed images at the end of each line scan. The system incorporates a high voltage switching system to switch the voltage level applied to the screen of the picture tube in order to provide the necessary velocity switching of the electron beam. This switching comprises a transformer, the second winding of which is coupled with the relatively large capacitance provided by the screen of the picture tube. The primary side of the transformer is switched between open circuit and short circuit conditions. Energy is coupled into and out of the resonant circuit comprising the transformer inductance and the capacitance of the picture tube during a short circuit condition to cause the switching between high voltage levels on on the picture tube.

Figure 1:
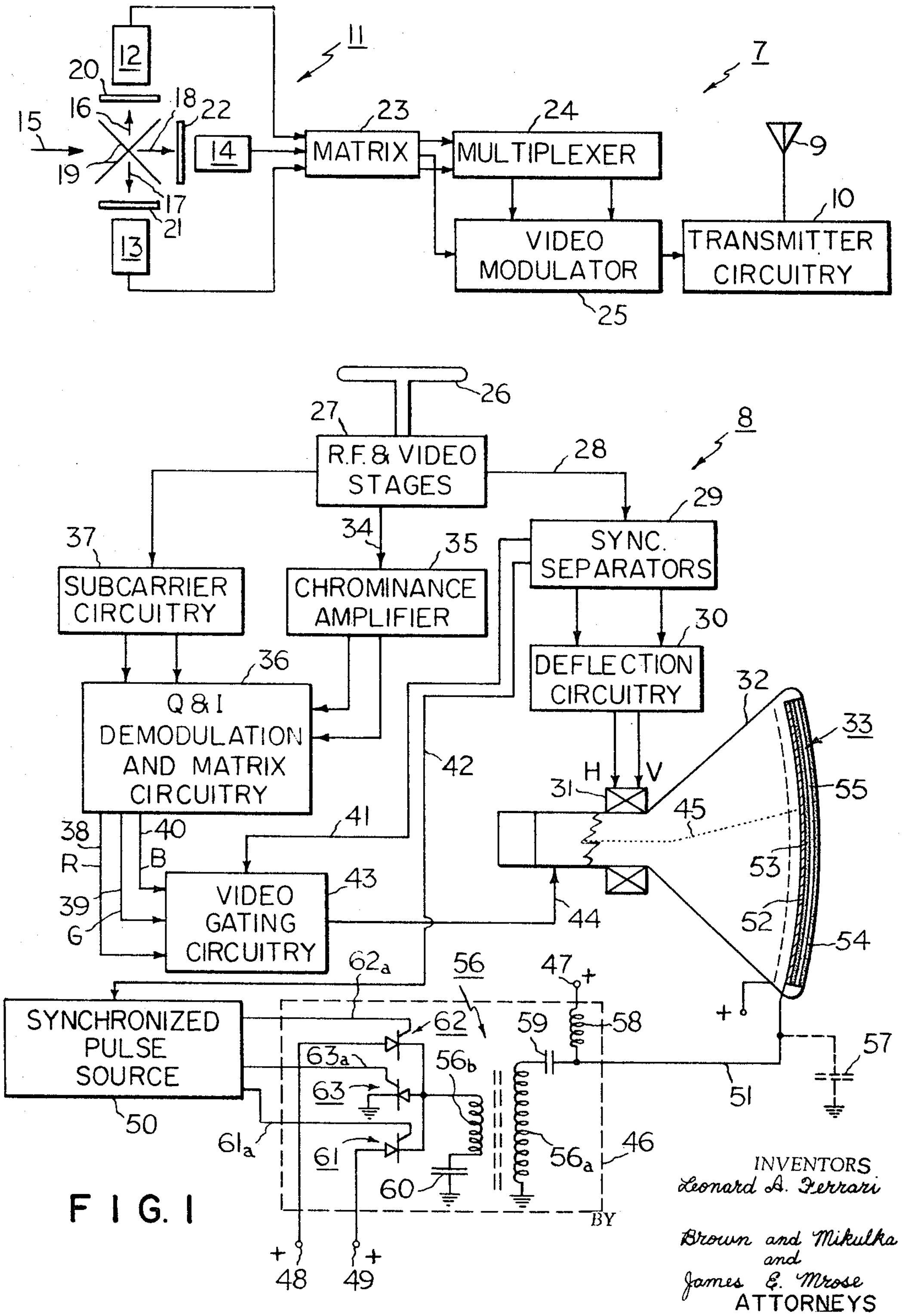

The present invention relates to improvements in the generation of electrical signals having triple-step waveforms, and, in one particular aspect, to novel and improved sources of electrical impulses, suitable for velocity modulation of three-color television picture tubes, wherein uncomplicated and reliable solid-state equipment slaved in relation to synchronizing signals produces cyclic rapid shifts between three predetermined levels of voltages.

In conformity with classical theories relating to color and its perception, reproductions of subjects in color have been approached by resolving discrete incremental areas of the broad-area subject in terms of three primary-color components and by attempting to duplicate, as closely as possible, each of these discrete incremental areas with the same primary colors in the same proportions. Conventional three-color television systems provide a typical example of this point-by-point approach; there, each element of a scene is separately viewed by three cameras each responding to a different one of its three (red, green and blue) primary-color contents, and, at a receiving site, electrical signals characterizing the camera detections for each point in the scene are translated into excitations of one or more of three phosphors (respectively emitting red, green and blue light) which serve a corresponding elemental area of the picture tube screen. Such viewing-screen phosphors commonly comprise minute dots arrayed in triangular clusters of three, and electron beams from three guns slaved with different ones of the three cameras are guided through a high-precision apertured shadow mask to impinge upon the different phosphor dots and thereby cause each emission of a different-color light from each of them to be in as direct a relation as possible to the amount of that same color which is present at a corresponding point in the televised scene. The inevitable search for greater economy, lesser criticality, increased brightness, better quality, and compatibility with small size, has led to a number of alternative proposals which, in particular, would obviate the need for these highly complex mask and dot-cluster features. By way of example, multistripe and multi-layer picture tube screens have been thought to be promising alternatives, with the latter holding the particular attraction that each of the three light-emitting materials needed to produce a different one of the primary colors may be introduced as a separate and substantially continuous broad-area layer near the face of a picture tube. Through proper selection of screen materials and control of electron-accelerating potentials each of the layers may theoretically be excited into emission of a different primary-color light output which should serve to recreate the televised scene in substantially full natural colors. Currently-preferred fabrications involve either the use of separate phosphor layers which may be deposited coextensively to form the composite screen, or, alternatively, a substantially homogeneous screen comprised of discrete juxtaposed amounts of the phosphors (example: grains of one phosphor each carrying coatings by the others). Modulation of the kinetic energies of the impinging electrons (via control of accelerating potentials) in theory provides an advantageous approach to modulation of the light emissions from the phosphors when they either inherently emit or artificially caused to emit differently under different accelerating-potential conditions. However, as a practical matter, it has not heretofore been possible to produce equipment of compact, economical and reliable construction which would provide the needed three levels of the accelerating potentials and would switch or change between these levels at sufficiently rapid rates to effect the required color changes. In three-color picture tubes, the levels and spacing between levels of needed accelerating potentials, and the electrical power involved, militate against color modulations on a high-frequency (typically 3.58 megacycles) dot-sequential basis; radiation problems alone necessitate the use of troublesome and costly shielding, for example. Instead, line- or field-sequential modulations, at significantly reduced rates, are more attractive for that reason, as well as for other reasons such as the fact that they better lend themselves to tape recording. Because field-sequential scanning tends to develop disturbing flicker, the line-sequential scanning mode is preferable. It had been found that excursions between two widely separated levels of voltage could be made very swiftly, and that the different levels of voltage might be sustained for relatively long periods of time, in special forms of inductive units coupled with capacitive loading and energized under control of semiconductor valving devices or the like. In accordance with the present teachings, devices of this general character are unexpectedly caused to make such excursions between more than two sustained levels of voltages in a simple direct sequence, and thus desirably lend themselves to the production of certain nonsymmetrical electrical signals which will serve to modulate the accelerations of electrons in penetration-type three-color television picture tubes in an optimum manner.

It is one of the objects of the present invention, therefore, to improve the production of color-controlling stepped electrical signals in three-color television apparatus.

Another object is to provide novel and improved electrical apparatus of inexpensive and uncomplicated construction which effectively switches between more than two potential levels at high rates and with high efficiency.

A further object is to provide unique and advantageous circuitry of simple and reliable form for cyclically driving a capacitive load directly between three predetermined potential levels rapidly and with small power losses, and including provisions for readily adjusting the intermediate potential level.

Another object is to provide an improved source of electrical pulses cyclically sustained at three successive levels in synchronism with triggering impulses.

Still further it is an object of the present invention to provide a novel generator of triple-stepped impulses at high voltage levels in unique association with the capacitive loading presented by the accelerating anode structure of a velocity-modulated three-color television picture tube.

An additional object is to provide a low-power line-sequential penetration-type three-color television receiver circuit wherein a uniquely-varied inductance and a capacitive loading by the accelerating anode structure of the picture tube together promote the formation of triple-stepped high-voltage waves having precise slaved relationships with synchronizing impulses.

By way of a summary account of practice of this invention in one of its aspects, received electrical signals characterizing the usual three color images (such as red, green and blue) of a televised scene are translated into form suitable for sequential gating, on a line-sequential basis, to the intensity-modulation electrode structure of a single-gun picture tube having three coextensive screen phosphor layers each predominantly emissive of a different color of visible light when the electron impingements are of distinctively different velocity. Synchronously with these gatings, the accelerating-anode structure of the picture tube must have its potential shifted to a high voltage level appropriate to its promotion of the electron velocity which will cause desired visible emissions from the screen. For the latter purposes, the relatively large capacitance of the screen structure is coupled with the secondary winding of a transformer the primary side of which is at different times caused to exhibit open-circuit or essentially short-circuit conditions. The short-circuit conditions, produced by causing brief pulses of current to flow the primary side unded control of semiconductor valving devices such as silicon controlled rectifiers, result in a low effective inductance, and, hence, a high resonant frequency LC combination on the secondary side at critical times when the voltages there should be changing rapidly from one level to another. The essentially open-circuit conditions, which are exhibited at other times, result in a high effective inductance, and, hence, a relatively low resonant frequency LC combination on the secondary side. The requirements for optimum line-sequential scanning in a three-color penetration-type picture tube are such that the different color emissions should occur repeatedly in a predetermined sequence, and the acceleration voltage is preferably repeatedly cycled to dwell first at a relatively low voltage level, for the duration of one line scan, and then at an intermediate voltage level for an equal time, and thirdly at a relatively high voltage level for a like time, after which the voltage is returned to the low level quickly to serve the needs of the next-succeeding line scan. At least one of the desired rapid changes in voltage level is achieved inductively by pulsing current through a primary winding from a D-C primary source, by way of a first SCR or like switching device triggered by a low-level pulse synchronized with the horizontal line-scan timing; this voltage change may be either additive or subtractive in relation to a high-voltage secondary D-C supplied to the accelerating anode structure from a high-voltage source. Another of the desired rapid changes in voltage is achieved by effecting a dissipation of capacitively-stored energy in the system, via another SCR associated with the primary circuit and triggered by another low-level pulse synchronized with the line-scanning periodicity. A third change in voltage is brought about under control of a yet further SCR in the primary circuit, similarly synchronized and triggered by other pulses, which either also dissipates capacitively-stored energy or conducts current supplied from a D-C primary source of predetermined voltage different from that of the other primary source. The net effective primary currents per cycle of resultant three voltage steps is arranged to be zero, such that there are no undesirable cumulative effects in the system.

Figure 2:
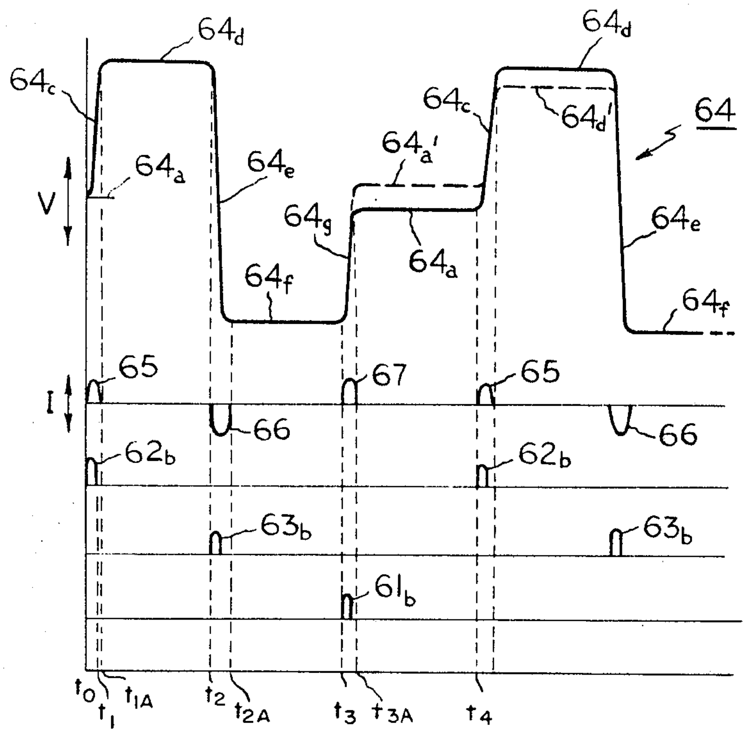
Figures 5, 6:
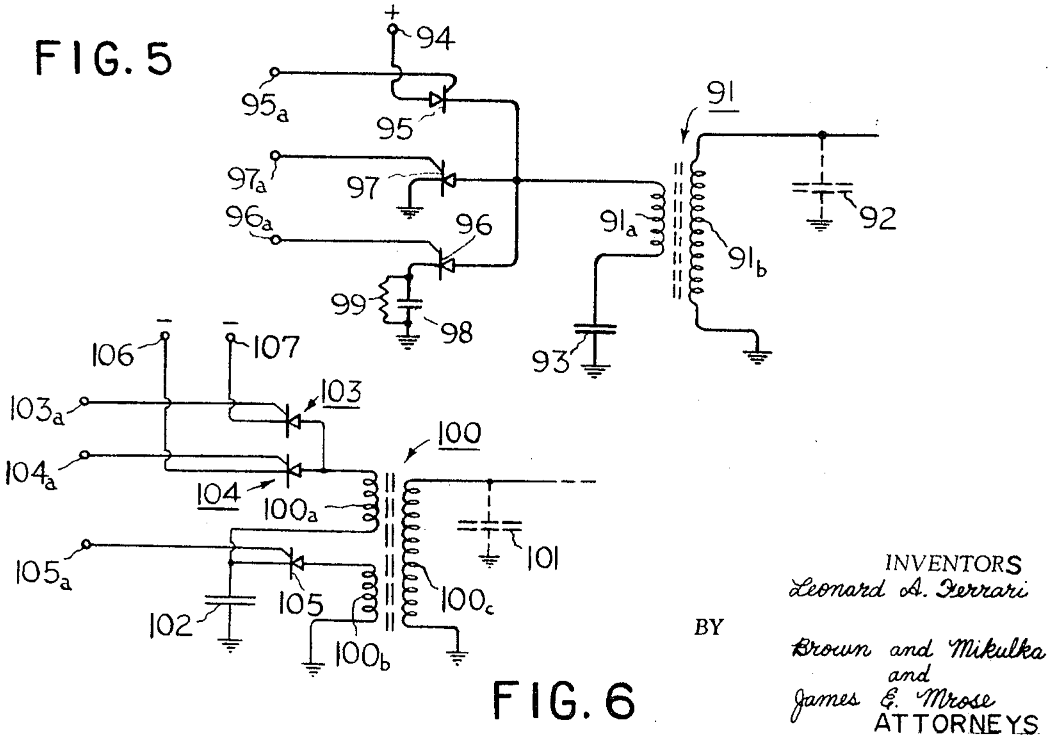
Figure 3:
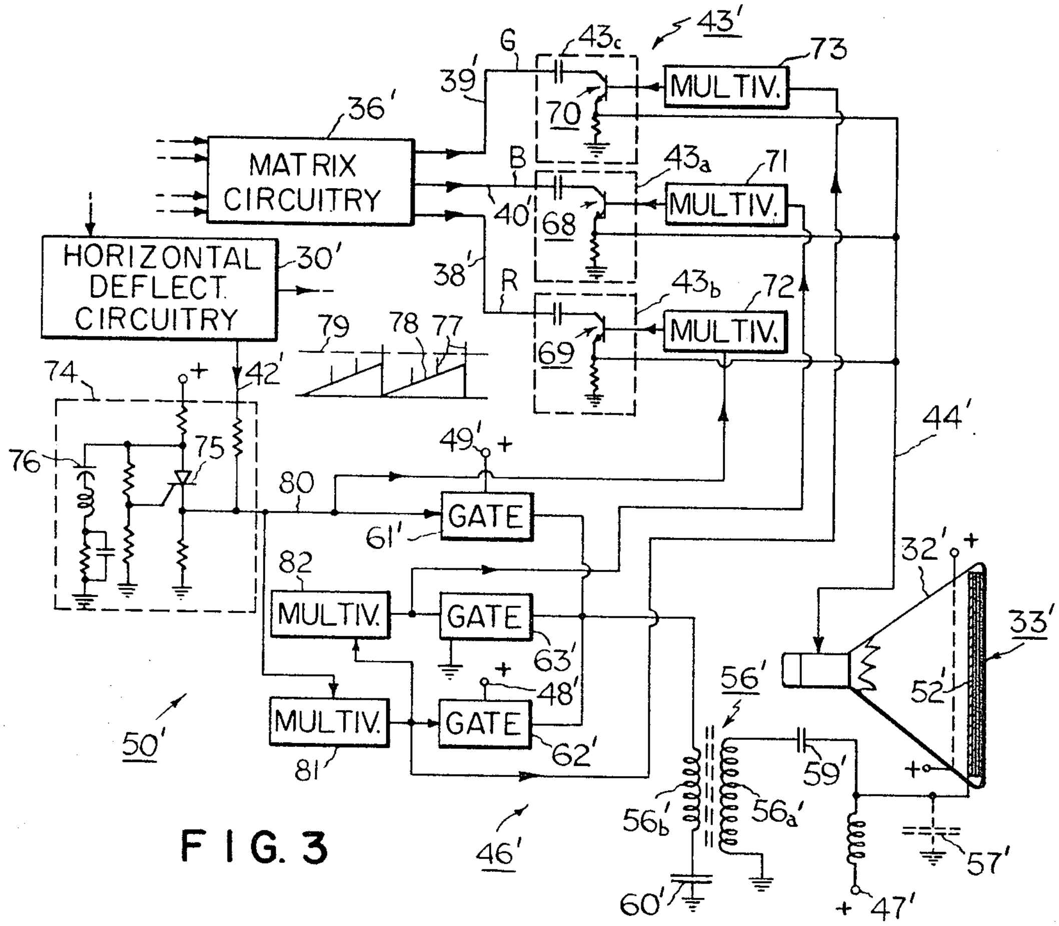
Figure 4:
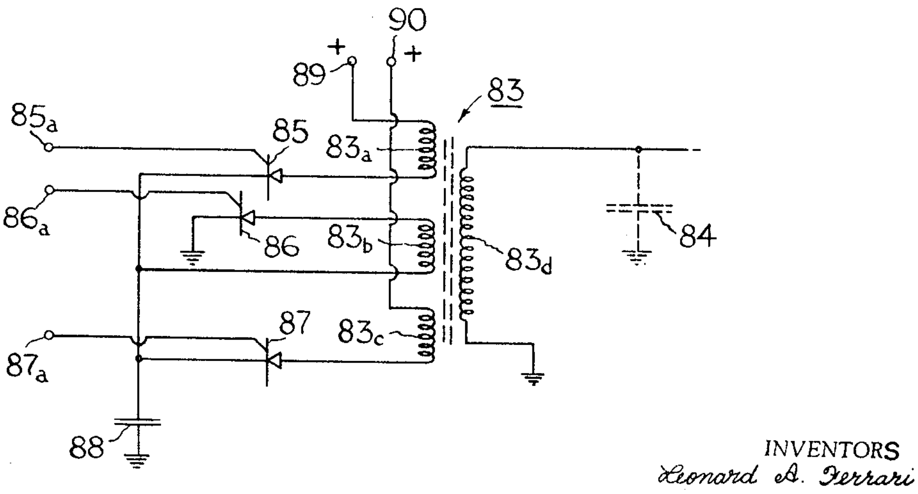

Although the features of this invention which are believed to be novel are expressed in the appended claims, further details as to preferred practices of the invention, as well as the further objects and advantages thereof, may be most readily comprehended through reference to the following description taken in connection with the accompanying drawings, wherein:

FIGURE 1 represents an improved three-color penetration type line-sequential television system of an arrangement in which the present teachings may be applied to particular advantage, the illustrations being in part in block-diagram and in part in schematic forms;

FIGURE 2 comprises a set of waveforms characterizing certain voltage and current conditions associated with the voltage-stepping circuitry of the receiver system of FIGURE 1;

FIGURE 3 illustrates a portion of a three-color television receiver like that of FIGURE 1, in block and schematic conventions, which aids in understanding the color-signal gating and voltage stepping features of the system;

FIGURE 4 provides a schematic diagram of an alternative embodiment of three-step voltage generator;

FIGURE 5 is a schematic diagram of an improved voltage generator involving a single primary excitation source; and FIGURE 6 schematically depicts an improved three-step voltage-changing circuit having two primary windings.

The system arrangement portrayed in FIGURE 1 includes color television transmitting and receiving apparatus 7 and 8, respectively, which are in generally conventional communication by way of electromagnetic radiations within a prescribed television-frequency channel. Transmitting antenna 9 is excited by transmitter circuitry 10 of known form adapted to deliver an output modulated to contain the customary components (audio, video, deflection, chrominance and color burst) for the color signals which are to be radiated. Luminance and chrominance aspects of televised scenes are characterized via a camera assembly 11 which includes the usual three image orthicon or equivalent pickup tubes, 12–14, electrically excited in the customary fashion. Light 15 emanating from a televised scene is shown to be optically resolved into three image beam 16–18 by a mirror array 19, and three different color filters 20–22 selectively pass different color contents of the scene (such as red, green and blue contents) to the pickup tubes. The camera outputs are processed by a conventional matrix 23 to produce the standard brightness and chrominance signals, which are then prepared for transmission by way of a known form of multiplexer 24 and modulator 25.

At the receiver 8, the high-frequency transmissions intercepted by antenna 26 are applied to a conventional embodiment of R.F. and video stage circuitry 27, where the received information is resolved into the component signals customarily processed in commercial three-color television receivers. Coupling 28 symbolizes the delivery of synchronizing signals to sync separators 29 serving the usual horizontal and vertical deflection circuitry 30 which supplies the deflection yoke 31 associated with the penetration-type picture tube 32 having a layered faceplate structure 33. In addition, coupling 34 characterizes the application of a chrominance (video modulation) signal to a chrominance amplifier 35 which delivers I and Q signal sideband components in quadrature to the Q and I demodulation an d matrix circuitry 36, the latter circuitry also being supplied by the output from subcarrier circuitry 37 which provides the needed subcarrier-frequency signals of phases which promote the desired decoding of the chrominance information into outputs, in couplings 38–40, representative of the red (R), green (G) and blue (B) color contents of the televised scene. The system as thus far described is of well-known form and, in addition to the outputs already referred to, further provides sync outputs, in couplings 41 and 42, which characterize synchronism with the horizontal line scanning.

For purposes of exciting the picture tube 32, the chrominance information outputs (R, G and B) are delivered to video gating circuitry 43, where, under synchronous slaving to the signals in coupling 41, they are gated on a line-sequential basis to the output coupling 44 feeding the picture tube control electrode or electrodes for modulating the intensities of the electron beam 45 from a single electron gun. Alternatively, these outputs may be individually applied to separate electron guns on a continuous basis, with the beams of these guns being gated on and off as required. Production of differently-colored visible emissions from the faceplate phosphor screen arrangement 33 depends upon the electron-acceleration voltages extant at various times. Three distinct levels of high voltage are required, and in the illustrated embodiment these are developed by way of a unique stepped-voltage supply 46 which is fed from a high-voltage D-C source terminal 47, from a first low-voltage D-C source terminal 48, from a second but higher low-voltage D-C source terminal 49, and from the triggering pulse outputs of a pulse source 50 synchronized with the horizontal line scans by the coupling 42. The resulting stepped voltages appearing in coupling 51 are applied to an inner conductive (i.e. evaporated aluminum) layer 52 which is of a type and form commonly used in picture tube constructions and serves as an accelerating anode. Phosphor screen material 53, preferably in a layer nearest the electron gun, responds to electrons having a relatively low kinetic energy (i.e. relatively low velocity, as determined by a relatively low potential applied to anode 52) by emitting visible light predominantly of first wavelengths such as those of one of the usual red, blue and green wavelengths. Phosphor screen material 54, preferably in a layer nearest the glass faceplate, efficiently emits visible light predominantly of second wavelengths, such as those of another one of the usual red, blue and green wavelengths, in response to impingements of electrons having a relatively high kinetic energy as determined by a relatively high potential applied to anode 52. The third phosphor screen material, 55, preferably in an intermediate layer, between the other two layers, emits visible light predominantly of third wavelengths, such as those of the third one of the usual red, blue and green wavelengths, in response to impingements of electrons having a kinetic energy between the relatively high and relatively low levels, as determined by a potential applied to the anode 52 at a level between the relatively high and relatively low potentials. In accordance with established practices, barrier layers of materials having known electron-retarding properties may be introduced to regulate the emissions from the different screen phosphor materials. The three phosphor materials may be excited into essentially separate emissions at different ones of the three potential levels, or more than one may be excited to emit simultaneously during the times when accelerating potentials are at predetermined levels (example: all three layers emit when the accelerating potential is at the highest level, to produce essentially whitish light output). Conductive screen or mesh 56, close to the target layers, and maintained at a fixed accelerating potential, is illustrated as one expedient for preserving essentially fixed accelerating potentials for the electron beam while it is undergoing horizontal and vertical deflections, thereby suppressing misregistrations of the three-color images, although other techniques for avoiding misregistration may be exploited instead.

Stepped-voltage supply 46 produces the desired accelerating potentials by superimposing upon the high D-C voltage of source terminal 47 certain induced voltages developed through inductive unit 56. This unit includes a secondary winding portion $56_a$ which is essentially in parallel with the capacitance to ground, 57, of the accelerating anode structure, this capacitance being represented in dashed linework. Choke 58 and capacitance 59 serve to isolate the inductive unit from the high-voltage D-C supply. On the primary side of the transformer-type inductance unit there is a primary winding portion $56_b$ which is connected in series with a storage capacitor 60 and with each of three electronic valving or gating devices 61–63. Semiconductor thyristors, such as the illustrated silicon controlled rectifiers (SCR's), are preferred for the gating actions which are to be performed. The anodes of SCR's 61 and 62 are connected with relatively high and relatively low D-C supply terminals 48 and 49, respectively, of low-impedance sources, and their gating leads are connected with the synchronized pulse source 50 for pulse excitations via couplings $61_a$ and $62_a$. SCR 63 is polarized differently, with its anode being connected to the primary winding $56_b$ and its cathode connected to a reference ground potential, its gating lead being excited by pulses from source 50 via coupling $63_a$. The gating pulse outputs from source 50 are delivered to the couplings $61_a$–$63_a$ in sequence, spaced by substantially the time of one line scan for the picture tube, and are effective to cause the voltage-stepping unit 46 to develop output voltages which are at the desired three different levels during the three successive line scans. When the gate lead of SCR 61 is properly excited by a pulse from the output coupling *61a* of synchronized source 50, the resultant gating of current from source terminal 49 through primary winding $56_b$ causes a voltage to be induced across secondary $56_a$. This induced voltage appears quickly, during approximately one-half cycle of the relatively high natural resonant frequency which is effective on the secondary side while the primary current causes the primary to exhibit the effects of a short circuit. When the primary current ceases, the primary side exhibits the effects of open-circuit conditions and the secondary inductance then becomes relatively high, such that the parallel combination of winding $56_a$ and accelerating-anode capacitance 57 has a relatively low natural resonant frequency. Accordingly, the moderately high level of voltage quickly developed on the secondary side tends to remain high for a relatively long period at least as long as the duration of one line scan. The next-succeeding gating pulse over coupling $62_a$ from synchronized source 50 gates the SCR 62 into conduction, and the higher anode voltage from terminal 48 causes flow of a brief primary current pulse which is effective to step the secondary voltage upwardly from the moderately-high level to a topmost level. The secondary resonance conditions at the different times (i.e., during and immediately after the gating) are as described for the first voltage-stepping and have the same types of beneficial effects. Storage capacitor 60 on the primary side builds up a charge during the two pulsings of current through primary winding $56_b$, and this charge is quickly released through the same primary winding and SCR 63 when the latter is gated into conduction by the third-successive gating pulse applied to its gating lead via coupling $63_a$ from source 50 after the duration of about one line scan following the second gating pulse. This discharging current is of direction which causes the secondary voltage to decrease rapidly to a lowermost level, where it remains for about the duration of one line scan before the entire cycle is repeated.

In the FIGURE 2 graphical representation of operating characteristics of the voltage-stepping circuitry, voltage waveform 64 represents the three-step output from the secondary side and, in a penetration-type color-television application, is superimposed upon a high-voltage D-C signal such as that from source terminal 47 in FIGURE 1. At time $t_0$, the secondary voltage is assumed to be at a moderately-high level $64_a$, and a gating impulse $62_b$ in coupling $62_a$ causes the SCR 62 to conduct and, under influence of the higher primary source voltage from terminal 48, to conduct a pulse of primary current 65 from which an increased level $64_b$ of secondary voltage is induced during the interval $t_0$–$t_{1A}$. The voltage transition $64_c$ shifts rapidly and in substantially sinusoidal manner as enabled by the high-frequency resonance conditions then existing. Uppermost voltage level $64_d$ is reached and held for about the usual line-scan interval, whereupon at time $t_2$ the discharge current pulse of primary current 66, derived from storage, is caused to flow by gating of SCR 63 in response to gating impulse $63_b$ in coupling $63_a$. The latter flow of primary current is accompanied by a rapid downward voltage shift $64_e$, to the lowest voltage level $64_f$. Subsequently, at time $t_3$, brief gating impulse $61_b$ in coupling $61_a$ causes the primary current pulse 67 to flow through SCR 61 and primary $56_b$, under influence of the moderately-high supply voltage from primary source terminal 49, whereupon the attendant rapid voltage shift $64_g$ raises the secondary voltage to the originally-considered moderate level $64_a$. The cycling is repeated under control of the interleaved equally-spaced gating impulses $61_b$, $62_b$, and $63_b$ from source 50. In the illustrated case of SCR gating devices, the gating impulses may be shorter than the voltage-shift times $t_0$–$t_{1A}$, $t_2$–$t_{2A}$, and $t_3$–$t_{3A}$, because, once gated on, the conduction does not cease until the anode-cathode polarization is reversed; the reversals tend to occur automatically with back-induced signals resulting from the ringing tendencies of the shock-excited secondary resonant-circuit combination, for example. When transistorized gating is employed, the gating impulses should persist for at least as long as the desired primary current pulses. For line sequential television applications, the periods $t_0$–$t_{1A}$, etc., may be of about the same duration as the flyback intervals, and occur simultaneously with them. Importantly, the maximum and middle-level voltages $64_a$ and $64_d$, and their relative values, may be closely regulated merely by setting the primary source voltages at the levels which produce these desired output voltages. Levels $64_{a'}$ and $64_{d'}$ exemplify such changes. The primary circuit impedances also influence these resulting output voltages, and may be adjusted to some extent for the same purposes also, provided the primary circuit impedances are not so high as to seriously affect the essentially "short-circuit" conditions which should exist on the primary side to effectively lower the inductance witnessed on the secondary side at those times when the natural frequency there is to assume a relatively high value.

Television receiver apparatus 8' shown in part in FIGURE 3 is like that illustrated in FIGURE 1, and functional counterparts are thus identified by the same reference characters with distinguishing single-prime accents added, for the purpose of simplifying these disclosures. The gating of the blue (B), red (R) and green (G) color-characterizing signals from matrix circuitry 36' is shown to be performed by three gating sections $43_a$, $43_b$, and $43_c$ of gating unit 43', these sections each including a different gating transistor 68–70, respectively, the bases of which are biased appropriately at the desired different times to pass the respective color-characterizing video signals to the common output coupling 44' in the desired repeated sequence. Biasing signals for these gating sections are produced by one-shot multivibrators 71–73, respectively, each of which is shown to be connected to respond to the same brief impulses which control the gates 63', 61' and 62', respectively, and each of which responds by producing an output biasing pulse of about the same duration as that of one line scan. For purposes of supplying the line-scan synchronized pulses to gates 61'–63' of the voltage-stepping unit 46' and to color-gating multivibrators 71–73, the horizontal deflection circuitry 30' is shown connected to deliver to coupling 42' and circuit 74 an output of pulses in synchronism with the system horizontal sync pulses. Divide-by-three circuit 74 is a relaxation oscillator involving a thyristor 75 and a capacitor 76 which is charged and discharged under control of the thyristor. Horizontal sync pulses applied to the cathode of device 75 cause breakdown of the device, and attendant sudden discharges of the capacitor, for every third periodic pulse in a horizontal sync pulse train. Ordinarily, the times of capacitor discharges would tend to be somewhat erratic, without the slaving to the horizontal sync pulses; however the latter negative pulses, which effectively add as pulses 77 to the capacitor charge voltage 78, are of sufficient value to insure that breakdown will occur exactly when intended (i.e. when every third pulse necessarily brings the compound voltages to the breakdown level 79), but not otherwise. Each such discharge thus produces a gating pulse in coupling 80, synchronously with the occurrence of every third horizontal sync pulse, and this gating pulse serves to trigger one of the three gates, gate 61', and one of the multivibrators, multivibrator 72, directly. This gating pulse is then used to excite a multivibrator 81 into production of another gating pulse, for triggering gate 62' and multivibrator 73, at the appropriate time delayed about the interval of one line scan from the first gating pulse. In turn, the output of multivibrator 81 excites multivibrator 82 into production of the third sequential gating pulse, after the appropriate delay, for triggering gate 63' and multivibrator 71, after which the cycle is repeated. In this manner the desired three-level stepped voltages for the picture tube accelerating anode 52' are produced in synchronism with occurrences of the gated color-characterizing video signals, and the needed electron-accelerations are brought about at the times when predetermined colors are to be developed in sequence during the sequential line scans.

The alternative voltage-stepping network appearing in FIGURE 4 involves three primary windings $83_a$, $83_b$ and $83_c$ and a single secondary winding $83_d$ in a transformer-type unit 83 having a capacitive load 84 in parallel with the secondary. Thyristors 85–87 serve to gate current through primary windings $83_a$–$83_c$, respectively, under control of gating impulses applied to the input terminals $85_a$–$87_a$. The primary winding $83_b$, through which the energy stored in capacitor 88 is discharged, is polarized in a different sense from that of the other two primary windings, such that its currents will cause the secondary voltage conditions to shift in the opposite direction from the shifts induced by the other two windings which are energized from the different-voltage source terminals 89 and 90. Operating characteristics are akin to those of the earlier-described single-primary network, and will be understood from what has been disclosed hereinabove.

In the alternate embodiment represented in FIGURE 5, the transformer unit 91 includes a single primary $91_a$ and a secondary $91_b$ in parallel with a capacitive load 92. Storage capacitance 93 accumulates charges as the primary draws current via a single source terminal 94 responsive to gating of thyristor 95 by each pulse applied to its gating lead via terminal $95_a$. Subsequently, the stored energy may be discharged in two stages, first partially, in response to gating of thyristor 96 by a pulse applied via terminal $96_a$, and then further in response to gating of thyristor 97 by a pulse applied via terminal $97_a$. Capacitor 98, shunted by resistance 99 in the cathode-to-ground circuit of thyristor 96 builds up a charge which then causes it to function, in the manner of a further primary source, to preserve the middle level of stepped output voltage.

Two primary windings, $100_a$ and $100_b$ are used in association with secondary winding $100_c$ of transformer unit 100 in FIGURE 6, the secondary capacitive load 101, like those discussed earlier herein, being either a separate capacitor or the capacitance-to-ground of an arrangement such as a picture tube target assembly. Storage capacitor 102 on the primary side is charged when the thyristors 103 and 104 are gated on in succession by trigger pulses applied to their gate lead terminals $103_a$ and $104_a$; primary currents then flow in the winding $100_a$ from the different-voltage negative D-C source terminals 107 and 106. Thyristor 105 is gated by pulses applied to its gating lead terminal $105_a$ to discharge the storage capacitor 102 through the other primary winding $100_b$ at appropriate intervals.

In each instance, the storage capacitor on the primary side of the inductance unit is preferably selected to have a significantly higher capacitance than that of the phosphor-screen and/or other capacitance in resonant-circuit combination on the secondary side, such that most of the electrical energy from the primary source or sources will be delivered to the latter capacitance. By way of example, the phosphor screen capacitance, to ground, may be about $10^{-6}$ times that of the storage capacitor, and about one-fiftieth as much peak current may be caused to flow in the phosphor screen capacitance as in the storage capacitance. Inductive coupling will cause energy on the secondary side to be withdrawn and contribute to primary current flow under certain operating conditions also. As has already been described, the primary voltage source or sources may be negative, rather than positive, and the voltage stepping witnessed at the output may be progressively upward or downward from a given reference. Where a separate similar or inverted waveform is desired as another output, the secondary winding may be tapped or may be provided with a companion winding for that purpose. The primary D-C supplies may be tapped or otherwise variable, to permit the overall voltage span and/or middle-level voltage to be adjusted to optimum values for the intended applications. For stable continuous operation, the primary currents fed and withdrawn during each cycle of the repeated voltage-stepping should be the same, and, in this connection, the two smaller primary current pulses 65 and 67 of one sense are counterbalanced by one of the opposite larger current pulses 66 in FIGURE 2. For simplicity, the gating pulse inputs in the various figures are schematically illustrated as single-lead inputs, although SCR's which have their cathodes at A-C points in the circuits require and are to be provided with the usual triggering by way of pulse transformers having their secondaries connected across the cathode and gating leads. Embodiments which involve a minimum number of such A-C gating points and pulse transformers are of course preferable from an economic standpoint. There are numerous departures which may be made from the specific practices and constructions which have been thus far described, within the purview of the same teachings. By way of example, autotransformer units may replace the more conventional type of transformer devices of the illustrated embodiments, and the valving or gating may be performed by tubes, transistors or semiconductor devices other than the SCR's which have been shown. It will be evident that the stepped waveforms, whether superimposed on other signals or not, may be caused to have steps of unequal durations, provided the gating impulses are unequally spaced. Gating may of course be dispensed with where the primary supply voltage or voltages are provided in pulse form. The circuitry may be readily adapted to respond to triggering impulses of different polarities from different sources. For some applications, the high-voltage steps may be essentially up or down from a predetermined level. And, the illustrated sequence and colors of picture tube phosphor layers may be varied from that Chosen for discussion. Accordingly, it should be understood that the embodiments and practices described and portrayed have been presented by way of disclosure, rather than by limitation, and that various modifications, substitutions and combinations may be effected without departure from the spirit and scope of this invention in its broader aspects.

What I claim as new and desire to secure by Letters Patent of the United States is:

1. Apparatus for producing stepped voltages, comprising inductive means in resonant-circuit combination with capacitance, means for coupling electrical energy in a direction into said resonant-circuit combination while simultaneously temporarily lowering the effective inductance of said inductive means in said combination, means for coupling electrical energy in a direction out of said resonant-circuit combination while simultaneously temporarily lowering the effective inductance of said inductive means in said combination, at least one of said coupling means including means for coupling the total of said energy in one of said directions in more than one discrete step at different times, one of said coupling means including means for supplying electrical energy to storage simultaneously with its lowering of said effective inductance, and the other of said coupling means including means for discharging the storage of said energy simultaneously with its lowering of said effective inductance.

2. Apparatus for producing stepped voltages as set forth in claim 1 wherein said means for coupling the total of said energy in one of said directions includes means for coupling portions of the total of said energy in said one of said directions in immediate succession to one another after a predetermined time delay.

3. Apparatus for producing stepped voltages as set forth in claim 2 wherein said means for coupling the total of said energy in one of said directions includes means for coupling two portions which comprise the total of said energy in said one of said directions.

4. Apparatus for producing stepped voltages as set forth in claim 3 wherein said one of said directions comprises the direction into said resonant-circuit combination.

5. Apparatus for producing stepped voltages as set forth in claim 3 wherein said means for coupling energy into and out of said resonant-circuit combination includes means for successively and repeatedly coupling said two portions of said energy in one of said directions and then coupling the total of said energy in the other of said directions, each after a predetermined time delay.

6. Apparatus for producing stepped voltages, comprising inductive means having an inductance portion connected in resonant-circuit combination with capacitance, said inductive means including inductance-changing means coupled with said inductance portion and capable of being switched between different states in which it causes said inductance portion to exhibit different values of inductance, and control means for switching said inductance-changing means between said different states, said control means including means for coupling a predetermined amount of electrical energy into the resonant-circuit combination synchronously with the occurrence of certain of said states, and means for coupling said amount of electrical energy out of said combination synchronously with the occurrence of certain of said states, at least one of said coupling means including means for coupling said predetermined amount of energy in more than one step at different times during occurrence of certain of said states.

7. Apparatus for producing stepped voltages as set forth in claim 6 wherein said inductive means comprises a transformer, wherein said inductance portion comprises a winding of said transformer, wherein said inductance-changing means includes primary winding means inductively coupled with said transformer winding, and wherein said different states include a substantially short-circuited state and a substantially open-circuited state of said primary winding means.

8. Apparatus for producing stepped voltages as set forth in claim 7 wherein said means for coupling said energy into said combination comprises low-impedance D-C source means and means for intermittently drawing current from said source means through said primary winding means in a sense to shock-excite said combination in one direction and to change the state thereof to said substantially short-circuited state.

9. Apparatus for producing stepped voltages as set forth in claim 8 wherein said certain of said states comprises said substantially short-circuited state, and wherein said means for coupling energy out of said combination comprises means for intermittently drawing current through said primary winding means in a sense to excite said combination in the opposite direction from said one direction.

10. Apparatus for producing stepped voltages as set forth in claim 9 wherein said means for coupling said energy into said combination includes means for storing energy intermittently drawn from said source means, and wherein said means for coupling energy out of said combination includes means for intermittently drawing current through said primary winding means at least in part from said means for storing energy.

11. Apparatus for producing stepped voltages as set forth in claim 9 wherein said means for intermittently drawing current from said source means and from said means for storing energy includes a plurality of electronic valving means and means for electrically biasing different ones of said valving means into conductive states periodically in a predetermined sequence.

12. Apparatus for producing stepped voltages as set forth in claim 11 wherein said valving means comprise semiconductor current-controlling devices each adapted to conduct current flow therethrough separately responsive to electrical biasing thereof into a conductive state, and wherein said means for electrically biasing comprises means for applying to gating electrodes of said devices spaced pulses which bias said devices into a conductive state, said pulses being of durations not substantially in excess of one-half cycle of the natural frequency exhibited by said combination when the inductance exhibited by said transformer winding is relatively low as the resiult of a substantially short-circuited state of said primary winding means.

13. Apparatus for producing stepped voltages as set forth in claim 12 wherein said means for coupling said energy into said combination includes means for storing energy intermittently drawn from said source means, and wherein said valving means includes means connecting said primary winding means with said source means through at least one of said devices, and means connecting said primary winding means in discharging relation to said means for storing energy through at least another one of said devices.

14. Apparatus for producing stepped voltages as set forth in claim 13 wherein said source means includes sources of at least different D-C voltage levels, and wherein said means connecting said primary winding means with said source means includes means connecting said primary winding means with one of said sources through one of said devices, and means connecting said primary winding means with a different one of said sources through a different one of said devices.

15. Apparatus for producing stepped voltages as set forth in claim 14 wherein said means for storing energy comprises a storage capacitor, and wherein the capacitance of said capacitance is smaller than that of said storage capacitor and absorbs most of the energy which it shares with said storage capacitor.

16. Apparatus for producing stepped voltages comprising inductive means in resonant-circuit combination with capacitance, at least three control means each electrically energizable to conduct current and thereby change the effective inductance of said inductive means, means for coupling electrical energy into said resonant-circuit combination synchronously with the change in effective inductance of said inductive means by at least one of said control means, means for electrically coupling energy out of said resonant circuit synchronously with the change in effective inductance of said inductive means by at least one other of said control means, and means for energizing said control means to conduct currents in a predetermined repeated sequence, said means for coupling energy coupling substantially the same amount of energy into and out of said resonant-circuit combination during each said sequence.

17. Apparatus for producing stepped voltages comprising a transformer including primary and secondary winding means, a capacitive load in parallel circuit combination with said secondary winding means, a first electrical power source of relatively low D-C voltage level, a second electrical power source of relatively high D-C voltage level, storage capacitor means, first, second and third thyristors, means connecting said primary winding means and said storage capacitor means with said first source through said first thyristor and with said second source through said second thyristor, means connecting said primary winding means in discharging relation to said storage capacitor means through said third thyristor, and means for periodically gating said thyristors into conduction at different spaced times in a predetermined sequence.

18. Apparatus for producing stepped voltages as set forth in claim 17 wherein said gating means includes means gating said thyristors in a sequence wherein gating of said second thyristor follows gating of said first thyristor in said sequence.

19. Apparatus for producing stepped voltages as set forth in claim 17 wherein said gating means includes means sequentially gating said thyristors into conduction for periods each not substantially in excess of about one-half cycle of the natural resonant frequency of said combination which is exhibited when said thyristors are gated into conduction.

20. Apparatus for producing stepped voltages as set forth in claim 19 wherein said means sequentially gating said thyristors into conduction gates said thyristors for said periods with predetermined spacings therebetween which are in excess of said periods.

21. Apparatus for producing stepped voltages as set forth in claim 19 wherein said primary winding means comprises a single winding, and wherein said third thyristor is connected to conduct current in a direction different from the currents conducted by said first and second thyristors.

22. Apparatus for producing stepped voltages as set forth in claim 19 wherein said primary winding means comprises two windings, and wherein said connecting means includes means connecting one of said primary windings with said sources through said first and second thyristors, and means connecting the other of said primary windings in discharging relation to said storage capacitor means through said third thyristor.

23. Apparatus for producing stepped voltages as set forth in claim 19 wherein said primary winding means comprises three windings, and wherein said connecting means includes means separately connecting two of said primary windings with said sources through different ones of said first and second thyristors, and means separately connecting the third of said primary windings in discharging relation to said storage capacitor means through said third thyristor.

24. Apparatus for producing stepped voltages as set forth in claim 17 wherein said first electrical power source comprises a further storage capacitor.

25. Apparatus for producing stepped voltages as set forth in claim 17 further comprising a further D-C source of high voltage, and means superimposing the voltage across said combination upon the voltage from said last-mentioned D-C source.

26. Television apparatus wherein scanning electrons in a picture tube are modulated by different accelerating potentials, comprising inductive means in resonant-circuit combination with capacitance, at least three control means each electrically energizable to conduct current and thereby change the effective inductance of said inductance means, means for coupling electrical energy into said resonant-circuit combination synchronously with the change in effective inductance of said inductance means by at least one of said control means, means for electrically coupling energy out of said resonant-circuit combination synchronously with the change in effective inductance of said inductance means by at least one other of said control means, means energizing said control means to conduct currents in a predetermined repeated sequence in synchronism with the line-scanning frequency for the picture tube, and means applying electrical signals from said resonant-circuit combination to the picture tube in control of the modulation of the scanning electrons thereof, said means for coupling energy coupling substantially the same amount of energy into and out of said resonant-circuit combination during each said sequence.

27. Television apparatus as set forth in claim 26 wherein said inductive means comprises a transformer including secondary winding means in said combination and primary winding means, wherein each of said control means includes first, second and third thyristors, wherein said means for coupling energy into said combination includes first and second electrical power sources of relatively low and high D-C voltage levels, respectively, and means connecting said primary winding means with said first and second sources through said first and second thyristors, respectively, wherein said means for coupling energy out of said combination includes a storage capacitor and means connecting said capacitor for charging through said first and second thyristors and for discharging through said primary winding means and said third thyristor, and wherein said means energizing said control means comprises means applying gating pulses to gating leads of said thyristors in said predetermined repeated sequence.

28. Television apparatus as set forth in claim 27 wherein said means applying gating pulses applies brief gating pulses to said first and then to said second thyristor in said sequence, said gating pulses being spaced by substantially the duration of one line scan in said picture tube.

29. Television apparatus as set forth in claim 27 wherein the capacitance of said capacitance is of the order of $10^{-6}$ times that of said storage capacitor, and wherein said means applying electrical signals from said combination to said picture tube includes a further D-C source of high voltage and means applying electrical signals from said combination to an accelerating anode of said picture tube in superimposed relation to the high voltage from said last-mentioned D-C source.

30. The method of producing stepped voltages across a highly capacitive load in tuned circuit combination with inductive means which comprises intermittently coupling electrical energy into the combination in a plurality of successive steps while simultaneously temporarily lowering the effective inductance of the inductive means in the combination, intermittently coupling energy out of the combination at times following said successive steps while simultaneously temporarily lowering the effective inductance of the inductive means in the combination, and lowering the effective inductance of said inductive means in the combination at the times of the different intermittent couplings by storing electrical energy and discharging the stored energy.

31. The method of producing stepped voltages as set forth in claim 30 wherein the storing of electrical energy is performed while coupling energy into said combination and the discharging of the stored energy is performed while coupling energy out of said combination.

32. The method of producing stepped voltages as set forth in claim 31 wherein said coupling of energy into said combination is performed in two successive steps, and wherein the storing and discharging includes cyclically storing and discharging substantially the same amount of energy.

References Cited

UNITED STATES PATENTS

| | | | |
|---|---|---|---|
| 3,138,722 | 6/1964 | Morgan | 307—305 X |
| 3,330,990 | 7/1967 | Guillette. | |
| 3,372,298 | 3/1968 | Merryman | 315—14 |

RODNEY D. BENNETT, Jr., *Primary Examiner.*

M. F. HUBLER, *Assistant Examiner.*

U.S. Cl. X.R.

307—246, 252